United States Patent [19]

Beerwerth et al.

[11] 3,900,153

[45] Aug. 19, 1975

[54] FORMATION OF SOLDER LAYERS

[75] Inventors: Wolfgang Beerwerth, Neheim-Husten; Albrecht Geppert, Warstein; Rigobert Schimmer, Belecke, all of Germany

[73] Assignee: Licentia Patent-Verwaltungs-G.m.b.H., Frankfurt am Main, Germany

[22] Filed: June 13, 1973

[21] Appl. No.: 369,495

[30] Foreign Application Priority Data

June 13, 1972 Germany ........................... 2228703

[52] U.S. Cl. ................. 228/246; 228/248; 228/249

[51] Int. Cl. ............................................. B23k 1/12

[58] Field of Search ......... 29/470, 500, 501; 228/56

[56] References Cited

UNITED STATES PATENTS

| | | | |
|---|---|---|---|
| 2,530,552 | 11/1950 | Stoddard | 29/501 |
| 3,193,920 | 7/1965 | Culbertson et al. | 29/500 |
| 3,209,449 | 10/1965 | Valentino et al. | 29/500 |
| 3,292,240 | 12/1966 | McNutt et al. | 29/501 |

FOREIGN PATENTS OR APPLICATIONS

| | | | |
|---|---|---|---|
| 225,008 | 4/1943 | Switzerland | 228/56 |

*Primary Examiner*—Gerald A. Dost
*Attorney, Agent, or Firm*—Spencer & Kaye

[57] ABSTRACT

In the formation of a solder connection between two parallel surfaces, particularly in the fabrication of semiconductor devices, the resulting solder connection is caused to have a desired thickness by combining solder material, prior to its introduction between the surfaces to be connected, with additives which are given dimensions equal to the desired solder layer thickness, the additives being of a material having a melting temperature higher than that employed to form the solder connection.

35 Claims, 1 Drawing Figure

PATENTED AUG 19 1975 3,900,153
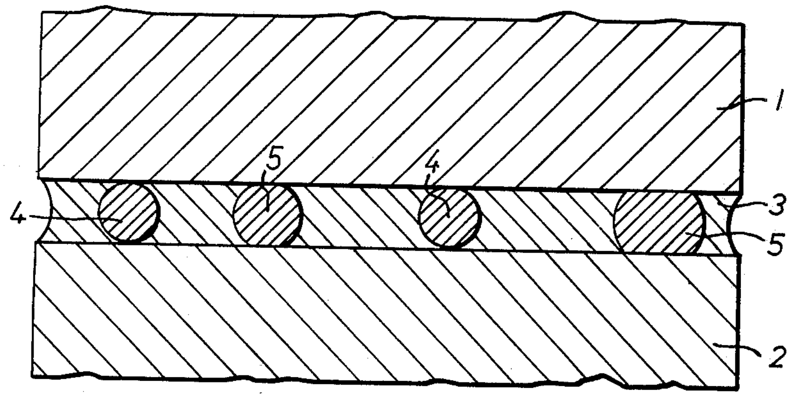

FORMATION OF SOLDER LAYERS

BACKGROUND OF THE INVENTION

The present invention relates to a method for producing a given thickness of solder layer, particularly in connection with the fabrication of semiconductor devices.

In the production of solder connections which serve as a mechanical connection as well as a thermal and electrical contact, there often exists the requirement that the solder layer have a given thickness after the solder has hardened. In addition, it has been found that the fatigue experienced by a solder connection which connects substances having different coefficients of thermal expansion is substantially dependent on the thickness of the solder layer.

In semiconductor devices, the solder connection between the semiconductor body and the metallic substrate is often subjected to strong alternating thermal stresses during operation. If a semiconductor device is to operate dependably even when such stresses alternate at a high rate, it thus becomes necessary to have the capability of setting the thickness of the solder layer to such a value that fatigue remains as low as possible.

It is known to provide the connecting electrodes of semiconductor devices, which electrodes are to be soldered together, with impressions or protrusions and to prevent the intended thickness of the solder layer from either falling below or exceeding the set value by applying sufficiently high contact pressure during the soldering process so that the desired solder layer thickness is assured.

However, this method is very costly since the semiconductor devices to be contacted often have very small dimensions and the assurance of imprints or protrusions within close tolerances requires the use of very complicated tools and apparatus.

It is also known to use solder molds and components with close tolerances to produce the given solder layer thicknesses. Since, however, solder connections require a certain contact pressure during the soldering process if a good connection is to be produced and, on the other hand, overflow of the liquid solder out of the connection is to be prevented, such methods can be used only with difficulty and with considerable expense if close tolerances are to be maintained so that they have also been found to be disadvantageous.

If the soldering operation is carried out using only simple soldering molds and weights and if reliance is placed only on the properties exhibited at the soldering temperature by the materials being employed, it results that excessively strict requirements are placed on temperature constancy, the composition of the solder and the wettability of the parts to be soldered together, so that uniform fabrication cannot be maintained, or can be maintained only with great difficulty, over long periods of time.

It is further known to produce constant solder layer thicknesses by the insertion of nets, rings or other molding elements. The drawback of these methods is that they necessitate an additional process step for the insertion of these spacers, as well as sometimes their local attachment. Moreover, the inclusion of gas, which leads to solder connections with shrink holes, can be avoided only with difficulty.

Finally it is known to incorporate additives in the form of powders in the soft solders for adjusting their coefficient of thermal expansion and for improving their thermal and electrical conductivity. However, these additives have no influence on the solder layer thickness in the sense of the present invention.

SUMMARY OF THE INVENTION

It is a primary object of the present invention to overcome the drawbacks and difficulties presented by the prior art solder layer forming methods.

It is a more specific object of the present invention to provide a method with which a given solder layer thickness can be realized in a simple and economical manner, even in the mass production of semiconductor devices with small dimensions and close tolerances for the solder layer thickness.

This is accomplished, according to the present invention, by a novel method for producing a solder layer of given thickness between two parallel surfaces during the production of semiconductor devices. According to this method, additives are incorporated into solder which is to form the layer, the solder with the incorporated additives is introduced between the surfaces and subjected to conditions which cause it to form the layer, and the additives are given dimensions such that, during the formation of the layer, the distance between the two parallel surfaces contacting the additives corresponds to the desired solder layer thickness, the additives being such that any change in their dimensions will only be within predetermined limits under the established soldering conditions.

BRIEF DESCRIPTION OF THE DRAWING

The single drawing FIGURE is a cross-sectional view showing a solder connection, or joint, formed in accordance with the present invention.

DESCRIPTION OF THE PREFERRED EMBODIMENTS

The method according to the invention for forming solder joints, or connections, between two essentially parallel surfaces can be carried out through the use of standard soldering procedures and by employing the time and temperature conditions appropriate for the particular solder composition and the bodies whose surface are to be joined. In fact, one advantage of the invention is that it does not require additional complicated steps or the establishment of special process conditions. To achieve the advantages of the invention, it is basically only necessary to incorporate suitable additives into the solder material before the connection layer is formed.

For the incorporation, or mixing in, of the additives, it is possible to first melt the solder and then to mix the melted solder with additives, mechanical mixing and rapid cooling taking care that the additives are uniformly dispersed throughout the hardening melt. It is also possible, however, to add the additives to the solder while both are in their solid states, as for example by applying the additives to a soldering foil and then rolling the same in, or mixing the additives with pulverized solder or pulverized solder components and thereafter sintering or melting together the parts.

For the sintering operation a powdered alloy, e.g. 60% lead, 40% tin, is mixed at room temperature with the additive bodies and then sintered together in a producer gas of 80% nitrogen and 20% hydrogen at 175°C. and atmospheric pressure or higher pressure.

The achievement and maintenance of a uniform distribution of the additives in the solder is facilitated if the density of the additives is equal, or comparable, to the density of the solder. Thus, it has been found to be satisfactory to add to a soft solder made of an alloy containing 90% lead, 5% indium and 5% silver and having a density of about 11 g/cm$^3$, additives made of an alloy containing 90% silver and 10% gold and having a comparable density.

The desired solder layer thickness is realized either in that the additives are initially given the same dimensions with the same tolerances, as the desired resulting solder layer thickness, or in that the dimensions of the additives are equal to and/or greater than the desired solder layer thickness and the material is shaped, subsequently but prior to the soldering process, to the desired solder layer thickness. Such shaping can be effected, for example, by rolling.

A further advantage of the method according to the present invention is that the quantity of the additives need be only slight and can be less than about 12% of the total mixture. Often 2%, or even less, of the additives is sufficient.

Advisably, the surface of the additives will be provided with a layer which is not soluble, or only insignificantly soluble, in the solder. It is also advisable for the surface of the additives or a layer placed on the surface to be wettable by the solder.

One or a plurality of metals or metal alloys whose melting points are higher than the melting point of the solder employed are suitable as additives. If the solder layer thickness is set to a smaller value by rolling of possibly larger additives, the metals or metal alloys must also be rollable.

From the large number of metals or metal alloys which seem to be suitable for the additive bodies used in the process according to the present invention, copper or nickel-plated copper, gold-silver alloys or nickel-plated gold-silver alloys with an approximate proportion of 10% gold and 90% silver, nickel-plated silver, or nickel have been found to be particularly well suited.

The additive bodies could also be made of hard molded bodies, for example tungsten, nickel-plated tungsten, molybdenum, nickel-plated molybdenum, glass, metallized glass, ceramic-like materials, or metallized ceramic-like materials.

As glass, for example, a boron-silicate glass of 80 % $SiO_2$, 2 % $Al_2O_3$, 13 % $B_2O_3$, 1 % $K_2O$ and 3 % $Na_2O$ and as ceramic material $Al_2O_3$ (96 %) or BeO is used. For the metallization a layer of 20 $\mu$m molybdenum-manganese, 5 $\mu$m nickel and 1 $\mu$m copper is used.

Soft solders of the type used in the production of semiconductor devices are suitable as solders, for example those made of a lead-indium alloy, a lead-indium-silver alloy, a lead-tin alloy or a gold-tin alloy, with the following exemplary compositions:

90% lead, 5% silver, 5% indium;
60% lead, 40% tin;
90% lead, 10% tin;
97% lead, 3% tin;
80% gold, 20% tin.

Possibly, hard solders can also be used instead of soft solders.

Advisably the additives will be in the form of spheres or cylinders.

The present invention provides the possibility of applying the solder together with the additives, the solder being in the solid or molten state to the parts to be connected, the solder being applied either to one of the parts or to both of them. Moreover, the solder provided with such additives can be used to produce molded solder components. In an advisable manner the solder containing the additives can also be applied by an immersion process, by roller plating or pressing, or by melting a solder foil.

In one specific embodiment in which the solder layer thickness is intended to be 70$\mu$ (microns), the method of the present invention can be carried out in the following manner.

Approximately 500 g of a lead-indium silver alloy containing 90% lead, 5% indium and 5% silver is melted in the presence of an activating gas containing approximately 80% nitrogen and 20% oxygen and brought to a temperature of 450°C. Approximately 10g of nickel-plated silver balls having diameters of 80 to 100$\mu$ are added to this molten solder while subjecting the solder mass to intense stirring. By then quenching this solder melt, it is assured that the additives will be approximately uniformly distributed in the hardened solder. The hardened solder is then rolled to a thickness of 70$\mu$ in rolling stages. From this solder foil, shaped solder pieces are cut, e.g. rings or discs, which are placed between the parts to be soldered together and together with these parts pass through a furnace where the solder connection is formed at a maximum temperature of 390°C.

A solder connection made in the above-described manner has the intended solder layer thickness of 70$\mu$. The maintenance of this solder layer thickness is no longer dependent on the contact pressure exerted during formation, or on the solder composition, the wetting properties of the parts to be connected, or the protective gas atmosphere, but is dependent only on the dimensional tolerance attainable during the rolling process.

The single FIGURE of the drawing is a sectional view of an exemplary solder connection made according to the process of the present invention. Between two parts 1 and 2 to be connected together there is placed a shaped piece of solder 3 which has been obtained in the above-described manner from a solder foil. Spherical bodies 4 are contained in the solder 3 as additives, their diameter corresponding to the intended solder layer thickness. Additionally, or alternatively, the solder contains bodies 5 formed of spheres initially having a diameter larger than the intended solder layer thickness and then brought to the intended layer thickness by rolling.

After heating to the melting temperature of the solder and after liquefication of the solder, the spacing between the facing surfaces of parts 1 and 2 is maintained by bodies 4 and/or 5. Thus even after cooling and resolidification of the solder this space will accurately correspond to the intended solder layer thickness.

It will be understood that the above description of the present invention is susceptible to various modifications, changes and adaptations, and the same are intended to be comprehended within the meaning and range of equivalents of the appended claims.

We claim:

1. A method for producing a solder layer of a selected thickness between two parallel surfaces during the production of semiconductor devices, comprising: incorporating additives into solder which is to form the layer; introducing such solder with the incorporated additives between the surfaces so that the additives extend between, and contact, the surfaces; subjecting the solder to time and temperature conditions which cause it to form the desired layer; and giving the additives dimensions such that during the formation of the layer the distance between the two parallel surfaces contacting the additives corresponds to the desired solder layer thickness, the additives being so selected that their dimensions can change only within predetermined limits under said time and temperature conditions.

2. Method as defined in claim 1 wherein the solder is in a liquid state during said step of incorporating.

3. Method as defined in claim 1 wherein the solder is in a solid state during said step of incorporating.

4. Method as defined in claim 3 wherein said step of incorporating is carried out by mixing the additives with pulverized solder or pulverized solder components and subsequently sintering or melting the additives and pulverized material together.

5. Method as defined in claim 1, wherein said step of giving is carried out by forming the additives, before said step of incorporation, to have the same dimensions, with the same tolerances, as the desired solder layer thickness.

6. Method as defined in claim 1 wherein said step of incorporating is carried out with additives which have dimensions at least equal to the desired solder layer thickness and said step of giving is carried out by shaping the solder and additives subsequent to said step of incorporating and prior to said step of subjecting for bringing such additives to the desired solder layer thickness.

7. Method as defined in claim 6 wherein said step of shaping is carried out by rolling to bring the additives to the desired solder layer thickness.

8. Method as defined in claim 1 wherein the amount of additives added to the solder is less than 12% of the total resulting mixture.

9. Method as defined in claim 1 wherein the additives have a density comparable to the density of the solder.

10. Method as defined in claim 1 wherein the additives are provided with a surface layer which is substantially insoluble in the solder.

11. Method as defined in claim 1 wherein the additives are bodies whose surface is of a material which is wettable by the solder when the solder is in its molten state.

12. Method as defined in claim 1 wherein the additives are constituted by at least one metal or metal alloy whose melting point is higher than the melting point of the solder.

13. Method as defined in claim 1 wherein the additives are constituted by at least one rollable metal or metal alloy.

14. Method as defined in claim 1 wherein the additives are bodies having a composition selected from the group consisting of: copper, nickel-plated copper, a gold-silver alloy, a nickel-plated gold-silver alloy, silver, nickel-plated silver, and nickel.

15. Method as defined in claim 14 wherein the composition is a gold-silver alloy containing approximately 10% gold and 90% silver.

16. Method as defined in claim 1 wherein the additives are constituted by hard molded bodies.

17. Method as defined in claim 1 wherein the additives are bodies of a composition selected from the group consisting of: tungsten, nickel-plated tungsten, molybdenum, and nickel-plated molybdenum.

18. Method as defined in claim 1 wherein the additives are bodies of glass or ceramic-like substances.

19. Method as defined in claim 18 wherein the additive bodies have metallized surfaces.

20. Method as defined in claim 1 wherein the solder is a soft solder.

21. Method as defined in claim 20 wherein the soft solder is of a composition selected from the group consisting of: lead-indium alloys, lead-indium-silver alloys, lead-tin alloys, and gold-tin alloys.

22. Method as defined in claim 21 wherein the soft solder composition is a lead-indium alloy containing approximately 70% lead and 30% indium.

23. Method as defined in claim 21 wherein the soft solder composition is a lead-indium-silver alloy consisting of approximately 90% lead, 5% silver and 5% indium.

24. Method as defined in claim 21 wherein the soft solder composition is a lead-tin alloy containing approximately 60% lead and 40% tin.

25. Method as defined in claim 21 wherein the soft solder composition is a lead-tin alloy containing approximately 90% lead and 10% tin.

26. Method as defined in claim 21 wherein the soft solder composition is a lead-tin alloy containing approximately 97% lead and 3% tin.

27. Method as defined in claim 21 wherein the soft solder composition is a gold-tin alloy containing approximately 80% gold and 20% tin.

28. Method as defined in claim 1 wherein a hard solder is used as the solder.

29. Method as defined in claim 1 wherein the additives are constituted by spherical bodies.

30. Method as defined in claim 1 wherein the additives are constituted by cylindrical bodies.

31. Method as defined in claim 1 further comprising, after said step of incorporating and before said step of introducing, stamping the solder into shaped pieces.

32. Method as defined in claim 1 wherein said step of introducing is carried out by applying the solder containing the additives to at least one of the two surfaces to be soldered together.

33. Method as defined in claim 1 wherein said step of introducing is carried out by immersing one of the surfaces in a molten mass of the solder containing the additives.

34. Method as defined in claim 1 wherein said step of introducing is carried out by applying the solder containing the additives by roller plating or pressing onto one of the surfaces.

35. Method as defined in claim 1 wherein said step of introducing is carried out by placing the solder containing the additives in the form of a foil and melting the solder foil on one of the surfaces.

* * * * *